United States Patent
Chin et al.

(10) Patent No.: US 9,001,778 B2
(45) Date of Patent: Apr. 7, 2015

(54) SYSTEM SYNCHRONIZATION IN TD-SCDMA AND TDD-LTE SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 12/977,564

(22) Filed: Dec. 23, 2010

(65) Prior Publication Data

US 2012/0163250 A1 Jun. 28, 2012

(51) Int. Cl.
*H04W 4/00* (2009.01)
*H04J 3/16* (2006.01)
*H04W 56/00* (2009.01)
*H04W 36/00* (2009.01)
*H04W 36/16* (2009.01)
*H04W 72/04* (2009.01)

(52) U.S. Cl.
CPC ........ *H04W 56/001* (2013.01); *H04W 36/0005* (2013.01); *H04W 36/16* (2013.01); *H04W 72/04* (2013.01)

(58) Field of Classification Search
CPC ... H04W 56/001; H04W 76/04; H04W 72/12; H04W 72/04; H04W 78/12
USPC ................................................. 370/280, 330
See application file for complete search history.

(56) References Cited

U.S. PATENT DOCUMENTS

| | | | |
|---|---|---|---|
| 7,047,011 B1 * | 5/2006 | Wikman ........................ 455/442 |
| 2007/0189205 A1 * | 8/2007 | Terry et al. .................... 370/328 |
| 2008/0056422 A1 * | 3/2008 | Rao et al. ....................... 375/357 |
| 2008/0117835 A1 * | 5/2008 | Grilli et al. ..................... 370/252 |
| 2008/0310321 A1 * | 12/2008 | Grilli et al. ..................... 370/252 |
| 2010/0130218 A1 * | 5/2010 | Zhang et al. ................... 455/450 |
| 2010/0227569 A1 * | 9/2010 | Bala et al. ........................ 455/73 |
| 2010/0273490 A1 * | 10/2010 | Velde et al. .................... 455/436 |
| 2010/0290369 A1 * | 11/2010 | Hui et al. ........................ 370/279 |
| 2011/0007856 A1 * | 1/2011 | Jang et al. ...................... 375/356 |
| 2011/0021215 A1 * | 1/2011 | Iwamura et al. ............... 455/458 |
| 2011/0028171 A1 * | 2/2011 | Guo et al. ....................... 455/502 |
| 2011/0207450 A1 * | 8/2011 | Siomina et al. ............ 455/422.1 |
| 2011/0243066 A1 * | 10/2011 | Nayeb Nazar et al. ........ 370/328 |

(Continued)

FOREIGN PATENT DOCUMENTS

CN 102007716 A 4/2011
WO WO0147289 A2 6/2001

(Continued)

OTHER PUBLICATIONS

International Search Report and Written Opinion—PCT/US2011/025115, ISA/EPO—Sep. 9, 2011.
Nokia: "Non-contention based handover execution" 3GPP Draft; R2-061848 HO Execution, 3rd Generation Partnership Project (3GPP), Mobile Competence Centre; 650, Route Des Lucioles; F-06921 Sophia-Antipolis Cedex; France, vol. RAN WG2, no. Cannes, France; Jun. 22, 2006, XP050141885, [retrieved on Jun. 22, 2006].
Taiwan Search Report—TW100105290—TIPO—Aug. 2, 2013.

*Primary Examiner* — Shripal Khajuria
*Assistant Examiner* — Joe Combs
(74) *Attorney, Agent, or Firm* — Kristine U. Ekwueme (57) ABSTRACT

Certain aspects of the present disclosure propose techniques for synchronizing TD-SCDMA and TDD-LTE systems. Certain aspects provide a method that generally includes obtaining, from a base station (BS) of a first radio access technology (RAT), timing and a system frame number (SFN) for a BS of a second RAT, and performing network acquisition operations with the BS of the second RAT using the timing and the SFN.

24 Claims, 8 Drawing Sheets

(56) References Cited

U.S. PATENT DOCUMENTS

| | | | |
|---|---|---|---|
| 2011/0255508 A1* | 10/2011 | Iwamura et al. | 370/331 |
| 2011/0310854 A1* | 12/2011 | Zou et al. | 370/336 |
| 2012/0008543 A1* | 1/2012 | Gou et al. | 370/312 |
| 2012/0020335 A1* | 1/2012 | Yellapantula et al. | 370/336 |
| 2012/0040674 A1* | 2/2012 | McGilly et al. | 455/436 |
| 2012/0149392 A1* | 6/2012 | Siomina et al. | 455/456.1 |
| 2012/0307670 A1* | 12/2012 | Kazmi et al. | 370/252 |
| 2013/0010619 A1* | 1/2013 | Fong et al. | 370/252 |
| 2013/0040673 A1* | 2/2013 | Siomina et al. | 455/501 |
| 2013/0070726 A1* | 3/2013 | Zhang et al. | 370/331 |
| 2013/0148551 A1* | 6/2013 | Lindh et al. | 370/277 |
| 2013/0223391 A1* | 8/2013 | Koo et al. | 370/329 |
| 2014/0254521 A1* | 9/2014 | Fong et al. | 370/329 |

FOREIGN PATENT DOCUMENTS

| | | | | |
|---|---|---|---|---|
| WO | WO 2009082111 A2 * | 7/2009 | | H04W 36/14 |
| WO | WO2009082111 A2 | 7/2009 | | |
| WO | WO2009114421 A2 | 9/2009 | | |
| WO | WO2010002692 A1 | 1/2010 | | |
| WO | WO 2010118681 A1 * | 10/2010 | | |

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 0 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SYSTEM SYNCHRONIZATION IN TD-SCDMA AND TDD-LTE SYSTEMS

BACKGROUND

1. Field

Certain aspects of the present disclosure generally relate to wireless communications and, more particularly, to synchronizing TD-SCDMA and TDD-LTE systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes obtaining, by a base station (BS) of a first radio access technology (RAT), timing and a system frame number (SFN) for a BS of a second RAT; and transmitting the timing and the SFN to a user equipment (UE).

In an aspect of the disclosure, an apparatus for wireless communications is provided. The apparatus generally includes means for obtaining, by a base station (BS) of a first radio access technology (RAT), timing and a system frame number (SFN) for a BS of a second RAT; and means for transmitting the timing and the SFN to a user equipment (UE).

In an aspect of the disclosure, an apparatus for wireless communications is provided. The apparatus generally includes at least one processor and a memory coupled to the at least one processor. The at least one processor is typically adapted to obtain, by a base station (BS) of a first radio access technology (RAT), timing and a system frame number (SFN) for a BS of a second RAT; and transmit the timing and the SFN to a user equipment (UE).

In an aspect of the disclosure, a computer-program product is provided. The computer-program product generally includes a computer-readable medium having code for obtaining, by a base station (BS) of a first radio access technology (RAT), timing and a system frame number (SFN) for a BS of a second RAT; and transmitting the timing and the SFN to a user equipment (UE).

In an aspect of the disclosure, a method for wireless communications is provided. The method generally includes obtaining, from a base station (BS) of a first radio access technology (RAT), timing and a system frame number (SFN) for a BS of a second RAT; and performing network acquisition operations with the BS of the second RAT using the timing and the SFN.

In an aspect of the disclosure, an apparatus for wireless communications is provided. The apparatus generally includes means for obtaining, from a base station (BS) of a first radio access technology (RAT), timing and a system frame number (SFN) for a BS of a second RAT; and means for performing network acquisition operations with the BS of the second RAT using the timing and the SFN.

In an aspect of the disclosure, an apparatus for wireless communications is provided. The apparatus generally includes at least one processor and a memory coupled to the at least one processor. The at least one processor is typically adapted to obtain, from a base station (BS) of a first radio access technology (RAT), timing and a system frame number (SFN) for a BS of a second RAT; and perform network acquisition operations with the BS of the second RAT using the timing and the SFN.

In an aspect of the disclosure, a computer-program product is provided. The computer-program product generally includes a computer-readable medium having code for obtaining, from a base station (BS) of a first radio access technology (RAT), timing and a system frame number (SFN) for a BS of a second RAT; and performing network acquisition operations with the BS of the second RAT using the timing and the SFN.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
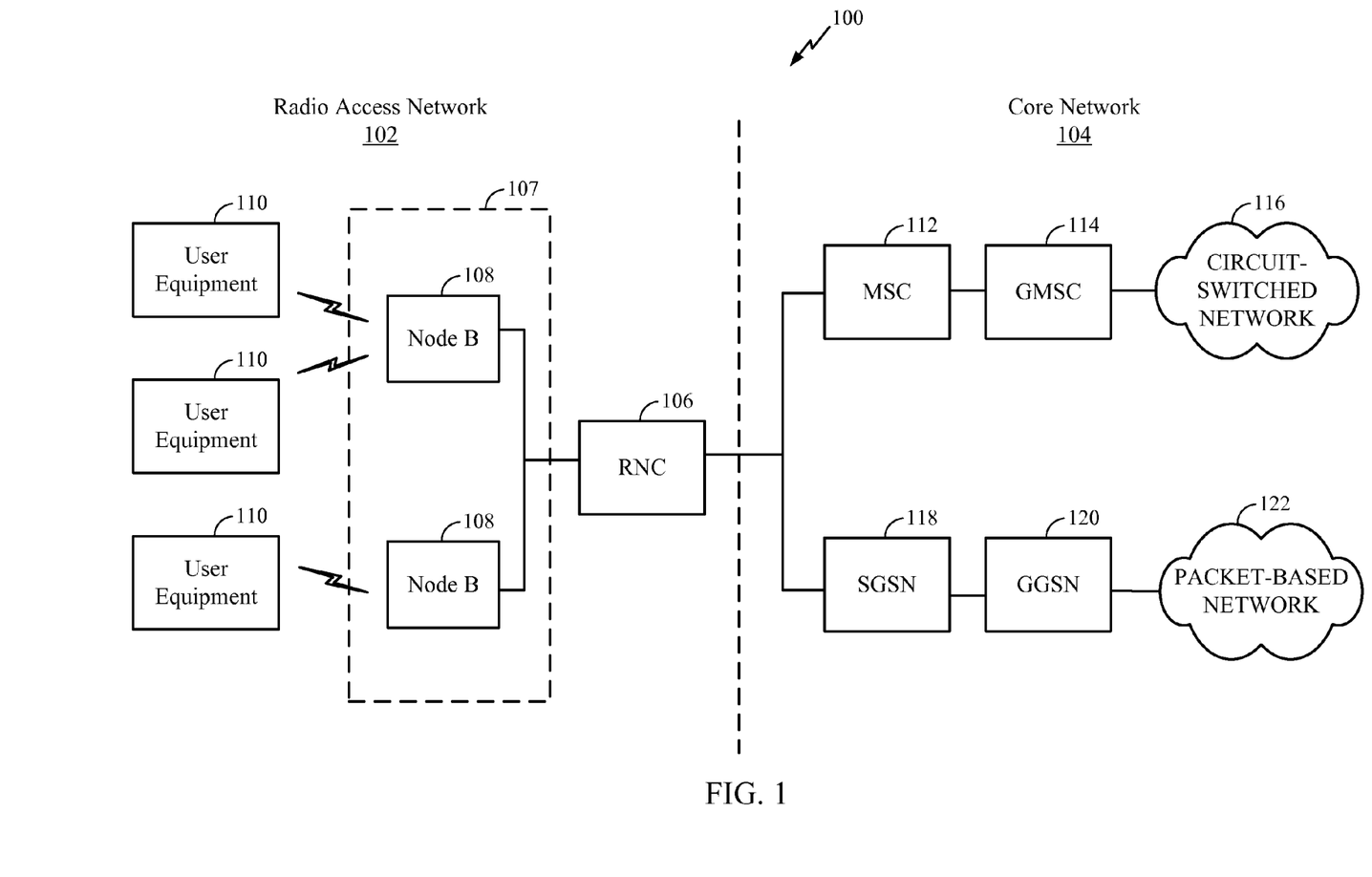
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
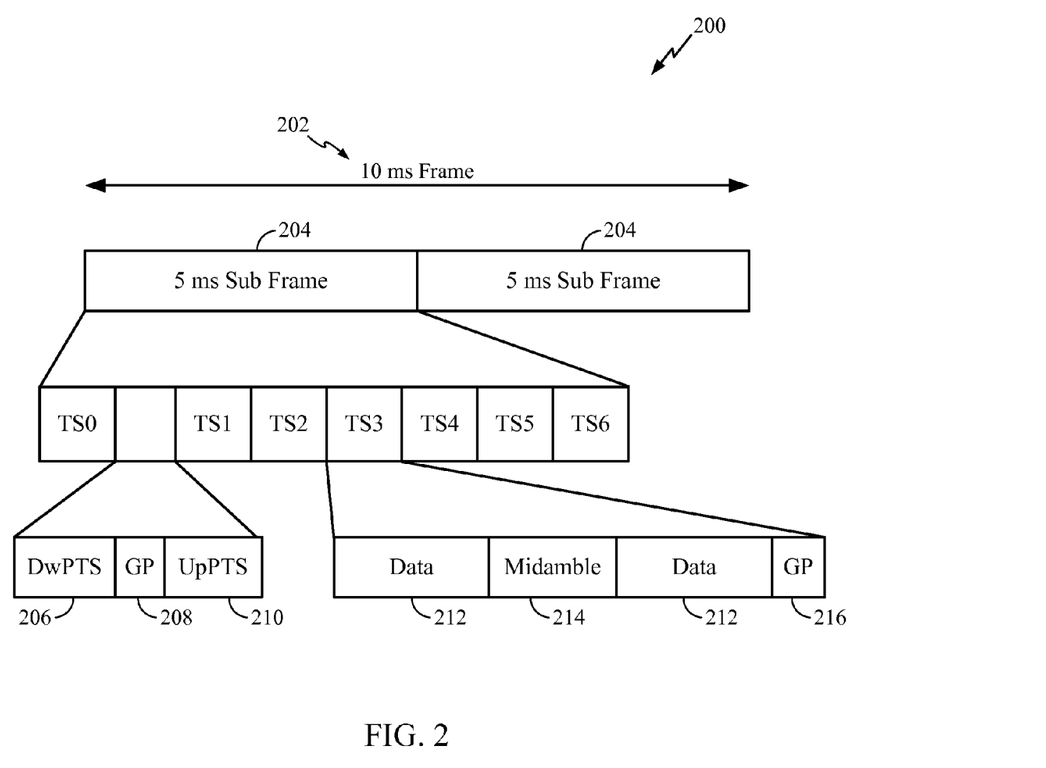
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
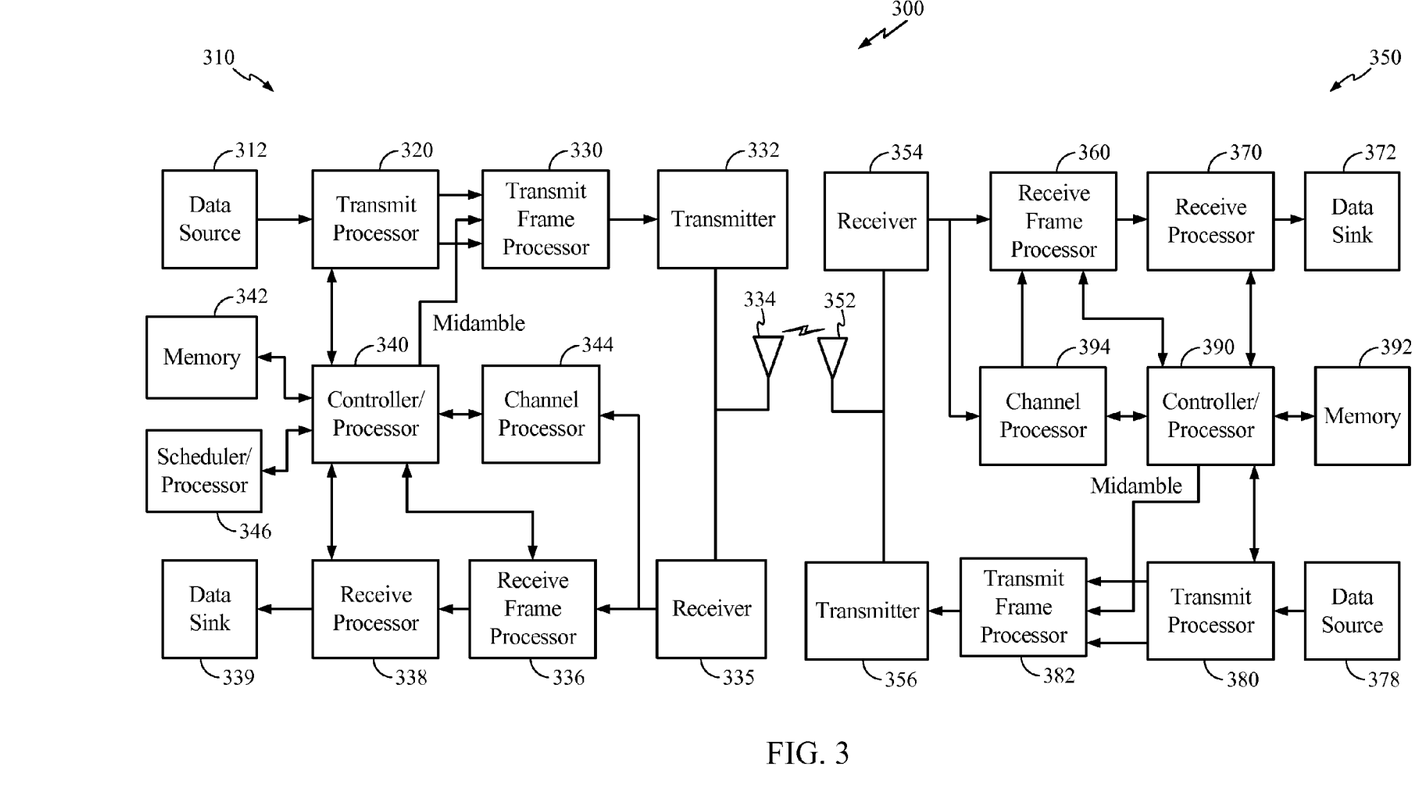
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
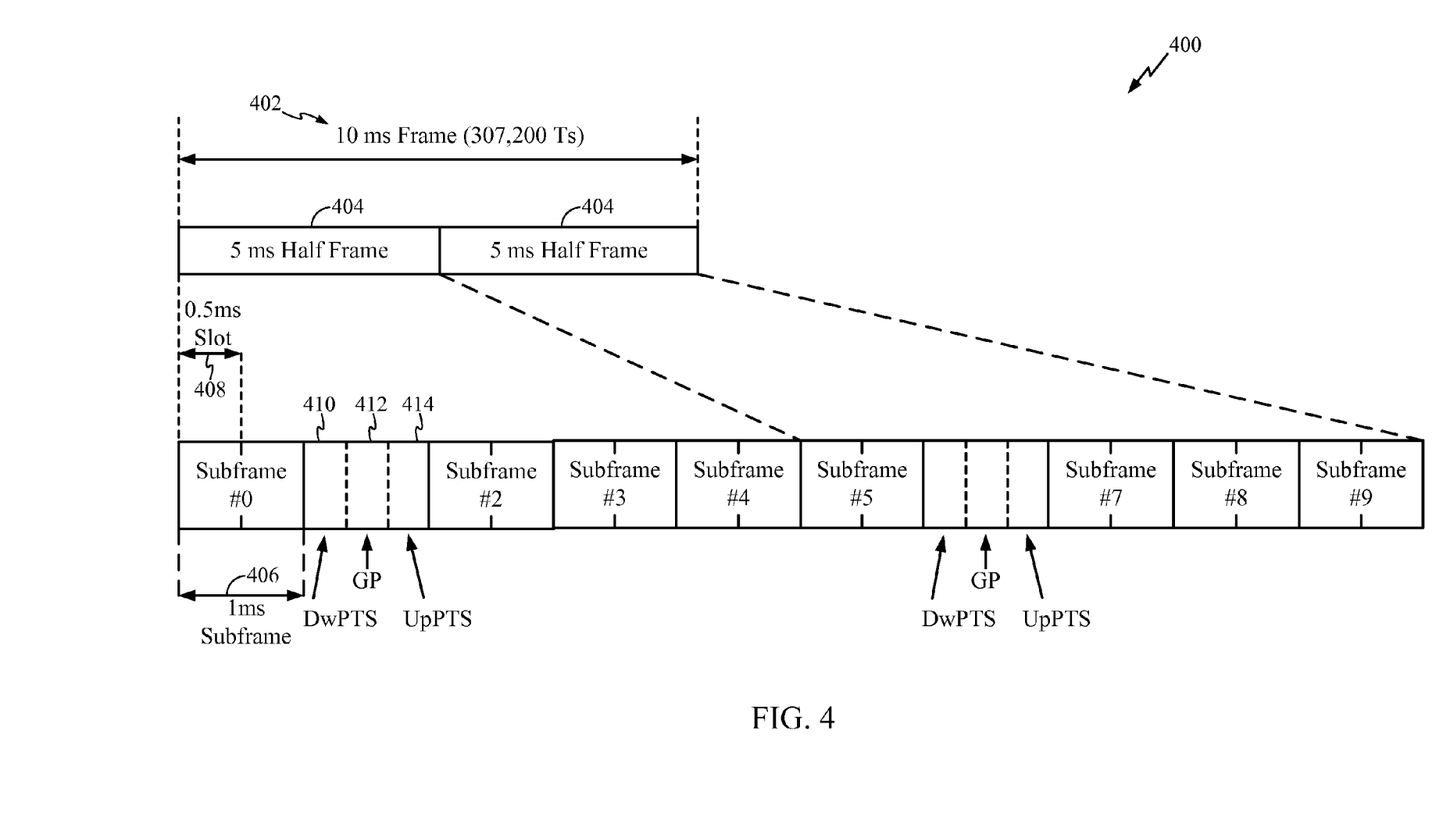
FIG. 4 is a block diagram conceptually illustrating an example of a frame structure in a telecommunications system in accordance with certain aspects of the present disclosure.

FIG. 4 shows a frame structure 400 for a Time Division Duplex Long Term Evolution (TDD-LTE) carrier. The TDD-LTE carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (S). Downlink subframes and uplink subframes may be divided into two 0.5 ms slots 408. Special subframes may be divided into a downlink pilot time slot (DwPTS) 410, a guard period (GP) 412, and an uplink pilot time slot (UpPTS) 414. Depending on the configuration, the duration of DwPTS, UpPTS, and GP may vary.

Figure 5:
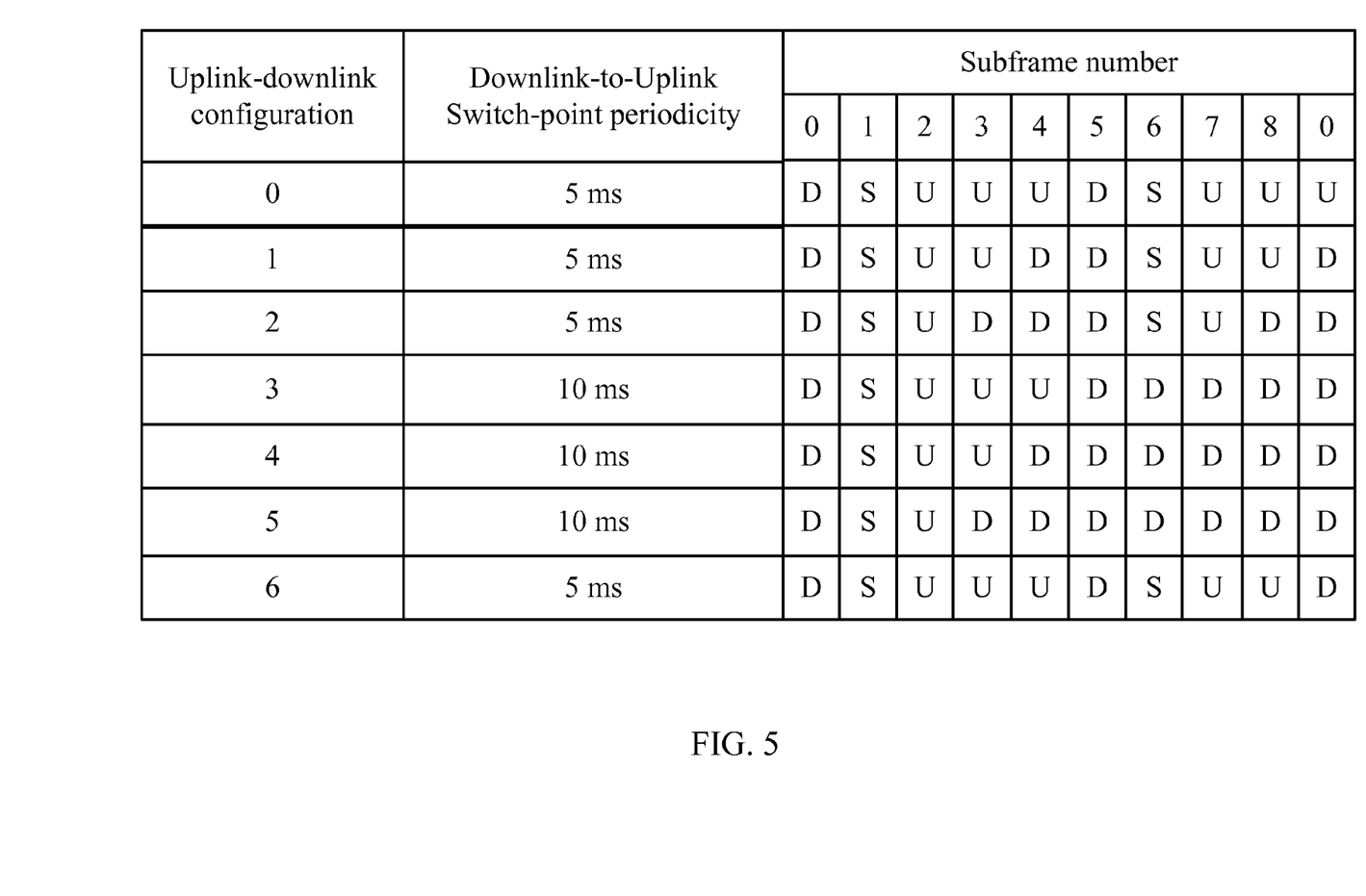
FIG. 5 illustrates an example list of downlink/uplink (DL/UL) configurations in a frame in the TDD-LTE standard in accordance with certain aspects of the present disclosure.

FIG. 5 illustrates an example list of the downlink/uplink configurations in a TDD-LTE frame 402 according to the LTE standard. In this table D, U, and S indicate Downlink, Uplink and Special subframes 406, respectively. The special subframe S may consist of DwPTS 410, GP 412, and UpPTS 414 fields. As illustrated, several DL/UL configurations for 5 ms switch point periodicity and 10 ms switch point periodicity may be chosen for a TDD-LTE frame 402. The configurations 0, 1, and 2 have two identical 5 ms half-frames 404 within a 10 ms TDD-LTE frame 402. In the case of 5 ms switch point periodicity, a special frame may exist in both half-frames 404. However, in the case of 10 ms switch point periodicity, a special subframe may exist in the first half-frame only. Subframes 0 and 5 and DwPTS may be reserved for DL transmission. In addition, UpPTS and the subframe immediately following a special subframe may be reserved for UL transmission.

An Example Method of System Synchronization in TD-SCDMA and TDD-LTE Systems

For a TD-SCDMA carrier, a primary common control physical channel (P-CCPCH) may be transmitted on TS0. The P-CCPCH may carry the broadcast control channel (BCCH) logical channel. Further, system information may be broadcasted in the P-CCPCH. The transmission time interval (TTI) for P-CCPCH may be 20 ms. The system information broadcasted in the P-CCPCH may comprise a system frame number (SFN) that identifies each 10 ms TD-SCDMA radio frame 202. The SFN may have 12 bits (i.e., from 0 to 4,095). The SFN may be required for time-related system operations, such as semi-persistent scheduling (SPS) and paging. To enable these operations, the UE may be required to acquire the SFN from the system information, which may take at least 20 ms. However, the TD-SCDMA frame boundary and the SFN may be synchronous to facilitate operations.

For a TDD-LTE carrier, a physical broadcast channel (PBCH) may be transmitted in subframe 0, centered at the TDD-LTE transmission bandwidth (e.g., 1.08 MHz bandwidth or six resource blocks). PBCH may carry the master information block (MIB) and the TTI may be 40 ms. The MIB may carry critical information, such as the SFN. The SFN for TDD-LTE may have 10 bits (i.e., from 0 to 1,023). However, the SFN in the MIB may have only the eight most significant bits (MSB) of the SFN. The two least significant bits (LSB) may be derived by detecting the 40 ms boundary of the MIB transmission. To enable the time-related system operations described above (e.g., SPS), the UE may be required to acquire the SFN in the MIB, which may take at least a multiple of 40 ms.

For some embodiments of the present disclosure, when performing a handover between a TD-SCDMA carrier and a TDD-LTE carrier (i.e., from a source RAT to a target RAT), the SFN for the TD-SCDMA carrier may be synchronous with the SFN for the TDD-LTE carrier, which may allow a UE to start a time-related system operation (e.g., SPS) in the target RAT without acquiring the SFN for the target RAT. For example, TD-SCDMA_SFN mod 1024=TDD-LTE_SFN, wherein the TDD-LTE_SFN may have only 10 bits but the TD-SCDMA_SFN may have 12 bits. Therefore, the synchronization requirement is that the 10 LSBs of the SFN for TD-SCDMA may be equal to the SFN for TDD-LTE.

With the frame boundary and the SFN being synchronous in TDD-LTE and TD-SCDMA, the UE may not need to acquire the frame boundary and SFN especially during mobility from the source RAT to the target RAT. Timing and the SFN may be derived from the source RAT. However, in mobility from TDD-LTE to TD-SCDMA, the UE may derive the 10 LSB of the SFN for TD-SCDMA to be used temporarily, and meanwhile acquire the 2 MSB of SFN for TD-SCDMA concurrently without delaying the timing related operations (e.g., SPS).

Further, the TDD-LTE system frame boundary may be synchronous (i.e., the 10 ms frame boundary may be aligned for all base stations (BSs)). In addition, the SFN for the TDD-LTE carrier may be synchronous (i.e., the SFN for all BSs may be the same).

Figure 6:
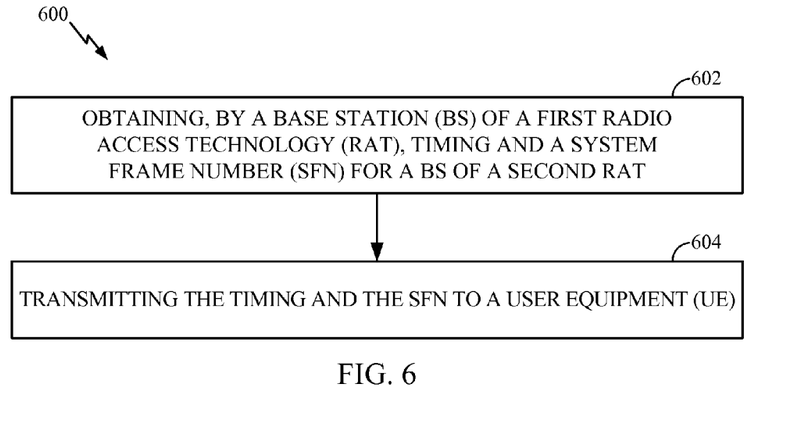
FIG. 6 illustrates example operations for transmitting timing and a system frame number (SFN) to a UE, in accordance with certain aspects of the present disclosure.

FIG. 6 illustrates example operations 600 in accordance with certain aspects of the present disclosure. The operations 600 may be performed, for example, by a BS of a first RAT in transmitting timing and an SFN. At 602, the BS of the first RAT may obtain the timing and the SFN for a BS of a second RAT. The SFN may be transmitted with system information. The SFN for the BS of the second RAT may be synchronous with an SFN for the BS of the first RAT. At 604, the BS of the first RAT may transmit the timing and the SFN to a UE. The BS of the first RAT may further transmit information regarding one or more procedures dependent on the SFN (e.g., SPS).

Figure 7:
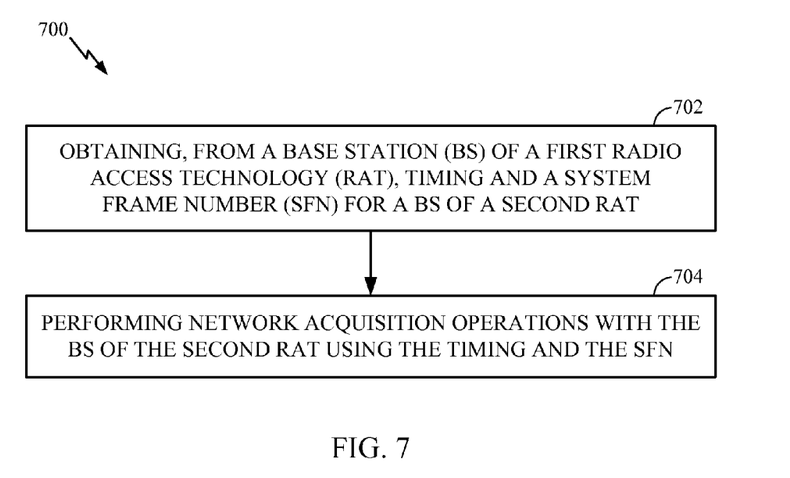
FIG. 7 illustrates example operations for performing network acquisition operations with a base station (BS) of a second radio access technology (RAT) using timing and an SFN obtained from a BS of a first RAT, in accordance with certain aspects of the present disclosure.

FIG. 7 illustrates example operations 700 in accordance with certain aspects of the present disclosure. The operations 700 may be performed by a UE in performing network acquisition operations with a BS of a second RAT. At 702, the UE may obtain, from a BS of a first RAT, timing and an SFN for the BS of the second RAT. The SFN may be received with system information. The SFN for the BS of the second RAT may be synchronous with an SFN for the BS of the first RAT. At 704, the UE may perform network acquisition operations with the BS of the second RAT using the timing and the SFN obtained from the BS of the first RAT. The UE may further receive information regarding one or more procedures dependent on the SFN (e.g., SPS). Therefore, the UE may start SPS using the SFN obtained from the BS of the first RAT.

Figure 8:
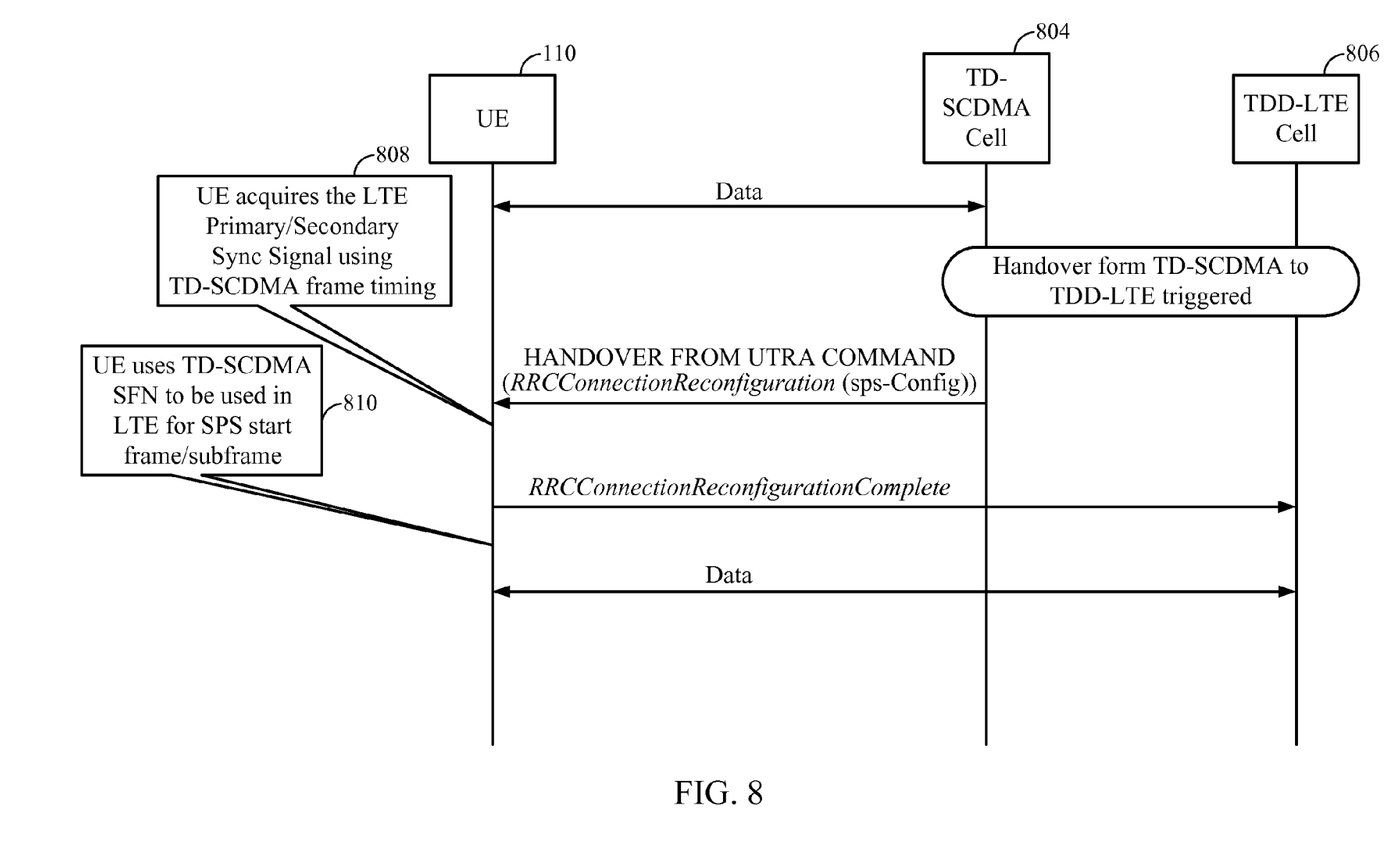
FIG. 8 illustrates a timing diagram of handover from a TD-SCDMA cell to a TDD-LTE cell, in accordance with certain aspects of the present disclosure.

FIG. 8 illustrates a timing diagram wherein a UE 110 may perform a handover from a TD-SCDMA cell 804 to a TDD-LTE cell 806. At 808, after receiving a handover command from the TD-SCDMA cell 804, the UE 110 may acquire primary and secondary synchronization signals of the TDD-LTE cell 806 using frame timing obtained from the TD-SCDMA cell 804. At 810, the UE 110 may start SPS in the TDD-LTE cell 806 without acquiring the SFN of MIB for the TDD-LTE cell 806. In other words, SPS configuration may be parameterized with a start frame and a start subframe, which may be derived from the SFN for the TD-SCDMA cell 804.

Figure 9:
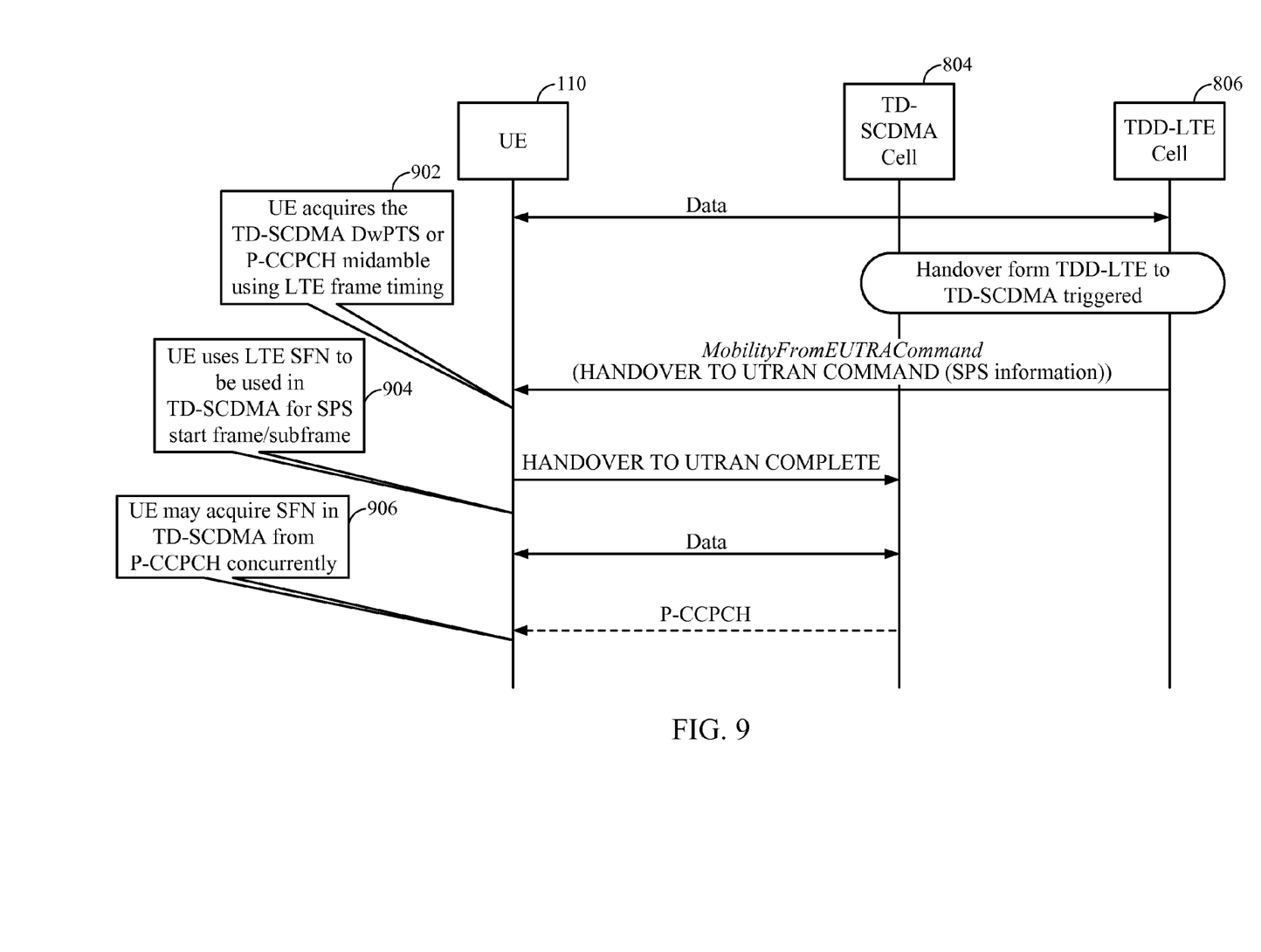
FIG. 9 illustrates a timing diagram of handover from a TDD-LTE cell to a TD-SCDMA cell, in accordance with certain aspects of the present disclosure.

FIG. 9 illustrates a timing diagram wherein a UE 110 may perform a handover from a TDD-LTE cell 806 to a TD-SCDMA cell 804. At 902, after receiving a handover command from the TDD-LTE cell 806, the UE 110 may acquire DwPTS and midamble of P-CCPCH of the TD-SCDMA cell 804 using frame timing obtained from the TDD-LTE cell 806. At 904, the UE 110 may start SPS in the TD-SCDMA cell 804 without acquiring the SFN for the TD-SCDMA cell 804. In other words, SPS configuration may be parameterized with a start frame and a start subframe, which may be derived from the SFN for the TDD-LTE cell 806. At 906, the UE 110 may concurrently acquire the SFN for the TD-SCDMA cell 804 from system information on the P-CCPCH. Therefore, the UE may derive (from the SFN for the TDD-LTE cell 806) the 10 LSB of the SFN for TD-SCDMA to be used temporarily, and meanwhile acquire the 2 MSB of SFN for the TD-SCDMA cell 804 concurrently without delaying the timing related operations (e.g., SPS).

For some embodiments, the UE may perform timing related procedures during mobility between TD-SCDMA and TDD-LTE systems with expedited performance.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communication, comprising:
   receiving, at a user equipment (UE), a handover command from a base station associated with a first radio access technology (RAT);
   determining, at the UE, at least a synchronization signal, a downlink pilot time slot, or a midamble of a second RAT based on a frame timing of the first RAT;

calculating, at the UE, a system frame number (SFN) of a the second RAT based at least in part on a SFN of the first RAT stored in the UE, a frame boundary and the SFN of the first RAT being synchronous with a frame boundary and the SFN of the second RAT; and transmitting, from the UE, a handover complete message to a base station associated with the second RAT based at least in part on the calculated SFN of the second RAT and the determined synchronization signal, downlink pilot time slot, or midamble.

2. The method of claim 1, in which the SFN of the first RAT is 10 bits and the SFN of the second RAT is 12 bits.

3. The method of claim 2, in which the calculating comprises calculating the SFN of the second RAT to be the SFN of the first RAT mod 1024.

4. The method of claim 1, further comprising:
performing data transmission after a handover from the first RAT to the second RAT using the calculated SFN of the second RAT.

5. The method of claim 4, further comprising:
acquiring the two most significant bits (MSBs) of the SFN of the second RAT during the handover.

6. The method of claim 1, in which the first RAT comprises Time Division Duplex Long Term Evolution (TDD-LTE) and the second RAT comprises Time Division Synchronous Code Division Multiple Access (TD-SCDMA).

7. An apparatus for wireless communication, comprising:
means for receiving, at a user equipment (UE), a handover command from a base station associated with a first radio access technology (RAT);

means for determining, at the UE, at least a synchronization signal, a downlink pilot time slot, or a midamble of a second RAT based on a frame timing of the first RAT;

means for calculating, at the UE, a SFN of a the second RAT based at least in part on a SFN of the first RAT stored in the UE, a frame boundary and the SFN of the first RAT being synchronous with a frame boundary and the SFN of the second RAT; and means for transmitting, from the UE, a handover complete message to a base station associated with the second RAT based at least in part on the calculated SFN of the second RAT and the determined synchronization signal, downlink pilot time slot, or midamble.

8. The apparatus of claim 7, in which the SFN of the first RAT is 10 bits and the SFN of the second RAT is 12 bits.

9. The apparatus of claim 8, in which the means for calculating comprises means for calculating the SFN of the second RAT to be the SFN of the first RAT mod 1024.

10. The apparatus of claim 8, further comprising:
means for acquiring the two most significant bits (MSBs) of the SFN of the second RAT during a handover.

11. The apparatus of claim 7, in which the first RAT comprises Time Division Duplex Long Term Evolution (TDD-LTE) and the second RAT comprises Time Division Synchronous Code Division Multiple Access (TD-SCDMA).

12. The apparatus of claim 7, further comprising means for performing data transmission after a handover from the first RAT to the second RAT using the calculated SFN of the second RAT.

13. A computer program product for wireless communication in a wireless network, comprising:
a non-transitory computer-readable medium having non-transitory program code recorded thereon, the program code being executable by a processor to perform the steps of:

receiving, at a user equipment (UE), a handover command from a base station associated with a first radio access technology (RAT);

determining, at the UE, at least a synchronization signal, a downlink pilot time slot, or a midamble of a second RAT based on frame timing of the first RAT;

calculating, at the UE, a SFN of a the second RAT based at least in part on a SFN of the first RAT stored in the UE, a frame boundary and the SFN of the first RAT being synchronous with a frame boundary and the SFN of the second RAT; and transmitting, from the UE, a handover complete message to a base station associated with the second RAT based at least in part on the calculated SFN of the second RAT and the determined synchronization signal, downlink pilot time slot, or midamble.

14. The computer program product of claim 13, in which the SFN of the first RAT is 10 bits and the SFN of the second RAT is 12 bits.

15. The computer program product of claim 14, in which the calculating comprises calculating the SFN of the second RAT to be the SFN of the first RAT mod 1024.

16. The computer program product of claim 13, in which the processor is further configured to perform the step of:
performing data transmission after a handover from the first RAT to the second RAT using the calculated SFN of the second RAT.

17. The computer program product of claim 16, in which the processor is further configured to perform the step of:
acquiring the two most significant bits (MSBs) of the SFN of the second RAT during the handover.

18. The computer program product of claim 13, in which the first RAT comprises Time Division Duplex Long Term Evolution (TDD-LTE) and the second RAT comprises Time Division Synchronous Code Division Multiple Access (TD-SCDMA).

19. A user equipment (UE) for wireless communication, comprising:
a memory; and
at least one processor coupled to the memory, the at least one processor being configured:
to receive a handover command from a base station associated with a first radio access technology (RAT);
to determine at least a synchronization signal, a downlink pilot time slot, or a midamble of a second RAT based on frame timing of the first RAT;
to calculate a SFN of a the second RAT based at least in part on a SFN of the first RAT stored in the UE, a frame boundary and the SFN of the first RAT being synchronous with a frame boundary and the SFN of the second RAT; and
to transmit a handover complete message to a base station associated with the second RAT based at least in part on the calculated SFN of the second RAT and the determined synchronization signal, downlink pilot time slot, or midamble.

20. The UE of claim 19, in which the SFN of the first RAT is 10 bits and the SFN of the second RAT is 12 bits.

21. The UE of claim 20, in which the at least one processor is further configured to calculate the SFN of the second RAT to be the SFN of the first RAT mod 1024.

22. The UE of claim 19, in which the at least one processor is further configured:
to perform data transmission after a handover from the first RAT to the second RAT using the calculated SFN of the second RAT.

23. The UE of claim 22, in which the at least one processor is further configured:
   to acquire the two most significant bits (MSBs) of the SFN of the second RAT during the handover.

24. The UE of claim 19, in which the first RAT comprises Time Division Duplex Long Term Evolution (TDD-LTE) and the second RAT comprises Time Division Synchronous Code Division Multiple Access (TD-SCDMA).

* * * * *